US00RE34116E

United States Patent [19]

Shindou et al.

[11] E Patent Number: Re. 34,116

[45] Reissued Date of Patent: Oct. 27, 1992

[54] ORGANIC COMPOSITE-PLATED STEEL SHEET

[75] Inventors: Yoshio Shindou; Motoo Kabeya; Takashi Shimazu; Fumio Yamazaki, all of Kimitsu, Japan

[73] Assignee: Nippon Steel Corporation, Japan

[21] Appl. No.: 725,762

[22] Filed: Jun. 28, 1991

Related U.S. Patent Documents

Reissue of:

[64] Patent No.: 4,876,160
Issued: Oct. 24, 1989
Appl. No.: 213,070
Filed: Jun. 29, 1988

[30] Foreign Application Priority Data

Jul. 6, 1987 [JP] Japan ..... 62-168393

[51] Int. Cl.[5] ..... B32B 15/08

[52] U.S. Cl. ..... 428/623; 428/626; 428/632; 428/653; 428/659; 428/935; 205/245; 205/246; 205/305; 427/410

[58] Field of Search ..... 428/623, 626, 632, 653, 428/659, 935; 204/44.2, 45.1, 55.1; 427/410; 205/245, 246, 305

[56] References Cited

U.S. PATENT DOCUMENTS 4,411,964 10/1983 Hara et al. ..... 428/626
4,659,394 4/1987 Hara et al. ..... 428/623
4,756,935 7/1988 Takimoto et al. ..... 427/410
4,775,600 10/1988 Adaniya et al. ..... 428/632

FOREIGN PATENT DOCUMENTS 149461 7/1985 European Pat. Off. .
59-162278 9/1984 Japan .
60-50181 3/1985 Japan .
60-149786 8/1985 Japan .
61-584 1/1986 Japan .
61-237766 2/1986 Japan .

*Primary Examiner*—John Zimmerman
*Attorney, Agent, or Firm*—Pollock, Vande Sande & Priddy

[57] ABSTRACT

Disclosed is a steel sheet having an organic composite plating layer excellent in press workability, spot weldability, electrodeposition coatability and corrosion resistance which comprises a zinc plated, aluminum plated or zinc base composite alloy steel sheet, a first layer of an insoluble chromate film of 5% or less in the content of water-soluble matter formed on the surface of the steel sheet at a coverage of 10–150 mg/m$^2$ in terms of chromium content and a second layer of a coating composition having the following composition coated at a thickness of 0.3–5 μm as a solid film on said first layer:

(A) a bisphenol type epoxy resin having a number-average molecular weight of 300–100,000 in an amount of 30% by weight or more of solid matter in the coating composition, (B) at least one curing agent selected from the group consisting of a polyisocyanate compound and a block polyisocyanate compound at a weight ratio to solid matter in the epoxy resin of 1/10–20/10, (C) fumed silica having an average particle size of 0.1–100 in an amount of 5–50% by weight of solid matter in the coating composition, and (D) a ketone organic solvent in an amount of 40% by weight or more of the coating composition, and the solid content of the coating composition being 10–50% by weight.

12 Claims, No Drawings

ORGANIC COMPOSITE-PLATED STEEL SHEET

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a reissue application of U.S. Pat. No. 4,876,160.*

BACKGROUND OF THE INVENTION

This invention relates to an organic composite-plated steel sheet applied with a film coating and more particularly it relates to an organic composite-plated steel sheet easily applied with a film coating which is superior in press workability, spot weldability and electrodeposition property and especially high corrosion resistance.

Recently, demands for reduction of cost and improvement of corrosion resistance of zinc or zinc base alloy plated steel sheets for automobiles and household appliances have increased and research on new products has been widely made.

For example, weldable steel sheets comprising a basic steel sheet film-coated with an electrically conductive coating composition containing an electrically conductive metal powder are disclosed in Japanese Patent Kokai No. 61-23766 and Japanese patent Kokoku No. 62-20024. As a representative thereof, Zincrometal has been offered as markets. However, these suffer from practical problems such as dragging caused by press working and flaws formed by sticking of peeled film to mold, resulting in damages of appearance of a pressed product.

Furthermore, improvement in corrosion resistance by application of an aqueous solution of a mixture of water-dispersible emulsion resin with a highly corrosion resistance chromic acid or a chromium compound onto the surface of zinc or zinc base alloy plated steel sheet are proposed in Japanese Patent Kokoku No. 55-51032 and Japanese Patent Kokai Nos. 59-162278 and 61-584. Although high in corrosion resistance, these sheets also have practical problems such as sweating and dissolving-out or chromium with aqueous treating solutions. Moreover, coating of a blend of water-dispersible emulsion resin and an organic composite silicate (silica sol, silane coupling agent) is proposed in Japanese Patent Kokai Nos. 60-50181 and 60-149786. According to these methods the problem caused by dissolving-out of chromium has been considerably improved, but since silica is contained as a stable colloid, alkali ion or ammonium ion is present which also causes problems in the properties of the coating film, especially water resistance. Further, in case of solvent type coating compositions containing powdered silica, the viscosity of the coating composition increases very much due to its structural viscosity and coating in uniform film becomes impossible. The viscosity may be reduced by breaking the structural viscosity with hydrogen bond of alcohols, but this method cannot be applied to the system where polyisocyanate compounds are used as curing agent.

Thus, thin film-coated corrosion resistance steel sheets have been required to have (1) higher corrosion resistance, (2) higher adhesion to coating film (especially cation electrodeposited film) formed on the steel sheet and (3) lower baking temperature (140°-170° C.) for improvement in working strength of the steel sheet. Various coating compositions have been proposed which can be expected to afford desirable results. However, since there is the problem of thixotropy in the coating composition as mentioned above which is considered to be especially significant in the system where polyisocyanate compound is used as a curing agent, none of practically applicable coating compositions containing organic solvent-soluble epoxy resin, polyisocyanate compound and silica particle have been obtained as those for solvent type thin film-coated corrosion resistance steel sheets.

SUMMARY OF THE INVENTION

Accordingly, the principal object of this invention is to provide for market a weldable organic composite-plated steel sheet which causes no dissolving-out of harmful substances such as chromium during surface treatment by users and is high in corrosion resistance and workability and superior in electrodeposition coatability which are attained by thin film-coating at low baking temperatures.

DESCRIPTION OF THE INVENTION

This invention which aims at overcoming the above problems is an organic composite-plated steel sheet excellent in press workability, weldability, electrodeposition coatability and corrosion resistance which comprises a zinc plated, aluminum plated or zinc base composite alloy plated steel sheet as a substrate, an insoluble chromate film of 5% or less in the content of water-soluble matter formed at a coverage of 10–150 mg/m$^2$ as a first layer on the surface of said substrate and a solid film of a coating composition having the following composition coated at a thickness of 0.3–5 μm on said first layer as a second layer:

(A) at least 30% by weight, based on the solid content of the composition, of a bisphenol type epoxy resin having a number-average molecular weight of 300–100,000, (B) at least one curing agent selected from the group consisting of a polyisocyanate compound and a block polyisocyanate compound at a weight ratio to the epoxy resin solid content of 1/10–20/10, (C) 5–50% by weight, based on the solid content of the composition, of fumed silica having an average particle size of 0.1–100 mμ and (D) above 40% by weight, based on the weight of the composition, of a ketone organic solvent, the solid content in the composition being 10–50% by weight.

In the above coating composition, the ketone organic solvent (D) can be at least one solvent selected from the group consisting of methyl isobutyl ketone, acetone and cyclohexanone.

Further, the above coating composition may contain a resol type phenol resin at a weight ratio of 10/1–1/10 to solid content of the curing agent (B).

Besides, the coating composition may contain a polyethylene wax in an amount of 0.1–10% by weight of solid content of the composition.

This invention is characterized in combination of a plated steel sheet having thereon a specific chromate film with a film of an organic solvent type coating composition comprising a bisphenol type epoxy resin, a polyisocyanate compound, fumed silica and a ketone organic solvent which is coated on said steel sheet. That is, the coating composition is characterized by containing a polyisocyanate compound, if necessary, a blocked polyisocyanate compound for low temperature baking and containing micronized dry silica (fumed silica) in a high concentration for improvement of corrosion resistance. As a result of intensive research for realization of organic composite-plated steel sheet improved in properties such as spot weldability, electrodeposition coatability and press workability by thin film-coating of the above coating composition, this invention has been proposed. This invention has also been made based on the finding that the viscosity of the coating composition can be effectively reduced by adding a ketone organic solvent to the system of bisphenol type epoxy resin/-polyisocyanate curing composition/fumed silica and it is important to add the solvent together with a lubricant, if necessary, to adjust the solid content of the coating composition to 10–50% by weight.

The zinc plated, aluminum plated and zinc base composite alloy plated steel sheets used in this invention include, as electroplated steel sheets, zinc plated steel sheets, zinc-nickel alloy plated steel sheets, zinc-iron alloy plated steel sheets, and zinc base composite plated steel sheets plated with zinc-nickel or zinc-iron alloy in which a metal oxide such as $SiO_2$, $TiO_2$, $Al_2O_3$, $ZrO_2$ or $BaCrO_4$ is dispersed and, as hot dipping plated steel sheets, galvanized steel sheets, alloyed zinc steel sheets, zinc-aluminum plated steel sheets and aluminum plated steel sheets. These may be plated by conventional methods.

The effects of this invention will be explained below.

(1) Insoluble chromate film

The chromate film used in this invention which is present between the under plating layer and the upper coating film is an important film in that it improves adhesion of the coating film, providing the resulting organic composite-plated steel sheet with high corrosion resistance. Especially, swelling and dissolving-out resistance against water is essential and thus the chromate film must be insoluble.

When water-soluble matter of the chromate film exceeds 5%, as mentioned above, chromium considerably dissolves out due to swelling of the chromate film and this causes deterioration in adhesion to the upper coating film and damages appearance of electrodeposited coating film (gas pinholes, etc.) and thus, it is difficult to further improve corrosion resistance. Furthermore, there often occur contamination of treating solution and complication of operation due to waste water disposal. The content of the water-soluble matter in the chromate film is preferably 3% or less.

When the deposition amount of the thus insoluble chromate film is less than 10 $mg/m^2$ in terms of total chromium amount, adhesion to the upper coating film is somewhat insufficient and it is difficult to further enhance corrosion resistance. When the total chromium amount exceeds 150 $mg/m^2$, adhesion to the upper coating film considerably decreases due to cohesive failure of the chromate film by press working and further, problems occur in continuous spotting at spot welding.

The deposition amount of an insoluble chromate film is preferably 20–100 $mg/m^2$ in terms of total chromium amount.

(2) Organic solvent type coating film

As epoxy binder resin (A) used in the formation of organic coating film according to this invention, there may be used bisphenol type epoxy resin which is organic solvent soluble, superior in water resistance and alkali resistance and especially superior in adhesion to the base and to the over coating film and has a number-average molecular weight of 300–100,000.

For example, the resin represented by the following formula may be used.

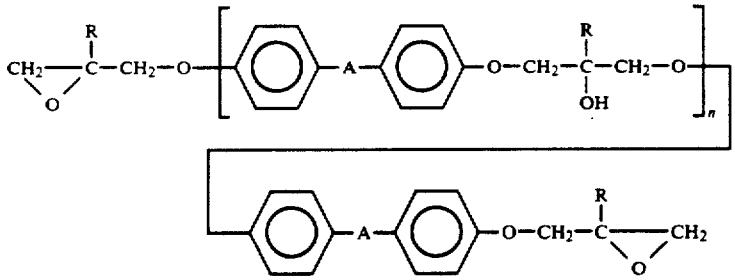

wherein R denotes H or $CH_3$ and —A— denotes $>C(CH_3)_2$,

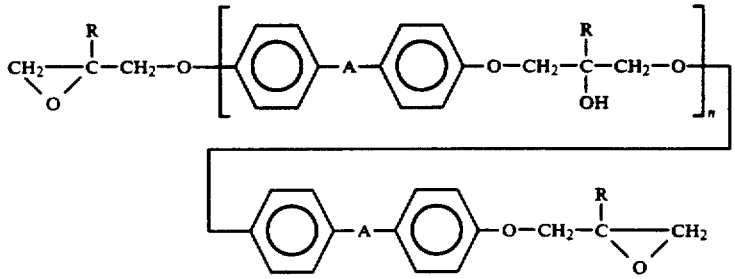

-continued $$-CH_2-,\ -O-,\ -\overset{\overset{\displaystyle O}{\|}}{\underset{\underset{\displaystyle O}{\|}}{S}}-$$

or —S—.

When —A— is $>C(CH_3)_2$ in the above formula, especially preferable result can be obtained. When the number-average molecular weight is less than 300, the reaction does not provide sufficient polymerization and corrosion resistance of the coating film is unsatisfactory. On the other hand, when more than 100,000, also the crosslinking reaction does not sufficiently proceed and similarly corrosion resistance of the coating film is insufficient.

The amount of the bisphenol type epoxy resin (A) must be 30% by weight or more based on the solid content of the coating composition. When less than 30% by weight, the binding action of the resin for dry silica decreases and formation of the coating composition becomes difficult and besides, the coating film is brittle, resulting in insufficient adhesion for working.

Next, the curing agent (B) comprises a polyisocyanate compound and/or a block polyisocyanate compound.

As the polyisocyanate compound, mention may be made of, for example, aliphatic or alicyclic diisocyanate compounds such as hexamethylene diisocyanate, isophorone diisocyanate and hydrogenated diphenylmethane diisocyanate, aromatic diisocyanate compounds such as tolylene diisocyanate and diphenylmethane-4-4'-diisocyanate, triisocyanate compounds such as adducts of 1 mol of trimethylolpropane and 3 mols of said diisocyanate and trimers of diisocyanate such as hexamethylene diisocyanate or tolylene diisocyanate. These may be used alone or in combination of two or more.

The block polyisocyanate compounds include, for example, said isocyanates blocked with a blocking agent. Such blocking agent must be such that the adduct produced by addition to the isocyanate group is stable at room temperature and dissociates at baking of the coating film to reproduce free isocyanate group.

As such blocking agents, mention may be made of, for example, lactam blocking agents such as ε-caprolactam and γ-butyrolactam, oxime blocking agents such as methyl ethyl ketoxime and cyclohexanone oxime, alcohol blocking agents such as methanol, ethanol and isobutyl alcohol, phenol blocking agents such as phenol, p-tert-butyl phenol and cresol and ester blocking agents such as ethyl acetoacetate and methyl acetoacetate. Especially preferred are methyl ethyl ketoxime and ethyl acetoacetate which dissociate at a low temperature and are stable under the conditions of storage of the coating composition.

The amount of the curing agent (B) is 1/10–20/10 at a weight ratio to the solid content of the epoxy resin (A). At a low temperature and in a short time, (A) and (B) react to afford a suitable vehicle system. The reaction sufficiently proceeds, for example, at the highest temperature of the material to be coated of 160° C. or lower and for a baking time of 5–60 seconds. When the mixing ratio (B)/(A) is less than 1/10, the crosslinking reaction proceeds insufficiently, resulting in reduction of corrosion resistance of the film. When it is more than 20/10, water resistance and alkali resistance of the coating film and besides adhesion to the overcoating film are insufficient.

If necessary, a resol type phenolic resin can be added to the curing agent. This is effective for acceleration of the film-forming reaction at low temperature baking (the highest temperature of sheet: about 100°–130° C.). Especially preferred is a resol type phenolic resin represented by the following formula:

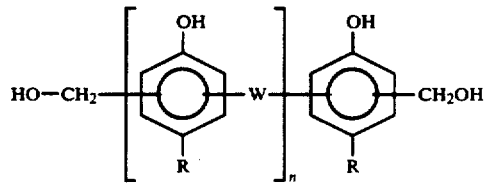

wherein n is 0–4; W denotes $-CH_2-$ or $-CH_2-O-CH_2-$ and R denotes $CH_3$, H or

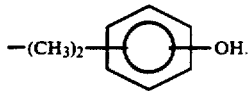

The addition amount of the resol type phenolic resin is preferably 10/1–1/10 at a weight ratio to the solid content of the curing agent (B). When the ratio is more than 10/1, alkali resistance decreases and is unsatisfactory and when less than 1/10, effect of acceleration of the reaction is sometimes not recognized.

Further, in the present invention, fumed silica (C) having an average particle size of 0.1–100 mμ is used in an amount of 5–50% by weight of the solid content of the coating composition in order to impart high corrosion resistance without dissolving-out of harmful substances into degreasing and film treating bath. If the silica particles is less than 0.1 mμ in average particle size as primary particle, alkali resistance and adhesion to the overcoating film are unsatisfactory. It is more than 100 mμ, the corrosion resistance decreases and besides smoothness of the electrodeposited coating film is deteriorated. Thus, the average particle size of the silica particle is within the range of 0.1–100 mμ, preferably 5 mμ–40 mμ. The amount of the fumed silica (C) is suitably 5–50% by weight, preferably 15–30% by weight of the solid content of the coating composition. The addition is fumed silica (C) in such a large amount has been made possible by the use of the following ketone organic solvent (D). When the amount of the fumed silica is less than 5% by weight, corrosion resistance is insufficient and when more than 50% by weight, adhesion for working of coating film and spot weldability of the sheet are unsatisfactory and further the composition becomes highly viscous and is difficult to coat in a uniform thin film. Thus, the object of this invention cannot be sufficiently accomplished.

According to this invention, the above components are dissolved or dispersed in an organic solvent to obtain the coating composition. As the organic solvent, a ketone organic solvent (D) is added in an amount of at least 40% by weight of the coating composition and the composition is adjusted to 10–50% by weight in solid concentration. A uniform thin film can be easily formed from such composition. If the solid concentration of the coating composition is less than 10%, the solvent content is too high and this is not economical and if more than 50%, a uniform thin film is difficult to form and thus coating operability is inferior.

Especially suitable ketone organic solvents are, for example, methyl isobutyl ketone, acetone, cyclohexanone and isophorone. If necessary, other solvents may be used in combination, but solvents which react with polyisocyanate compounds such as water and alcohol should not be used.

The relation between the solvent used and the fumed silica will be explained. When the content of fumed silica based on solid matter in the coating composition is increased in order to ensure high corrosion resistance, viscosity of the coating composition becomes too high and the composition is apt to agglomerate and uniform coating of the coating composition becomes difficult. Especially, it is almost impossible to form a uniform thin film (several microns). Hitherto, solvents high in hydrogen bonding such as water or alcohol solvents have been used to reduce the viscosity. However, these solvents have a limitation in kinds of the resins which they can dissolve and furthermore, isocyanate compounds cannot be used. Therefore, there is less degree of freedom is design for blending of coating compositions and it is difficult to obtain coating films of quality sufficient for attaining the object of this invention.

In this invention, as explained above, addition of fumed silica in high concentration has become possible by using ketone organic solvents and besides these solvents can stably dissolve the bisphenol type epoxy resin and polyisocyanate compound which can form rigid coating film at low temperatures. Thus, the object of this invention can be attained.

From the viewpoint of press workability of corrosion resistant steel sheet, the coating composition of this invention may contain lubricants such as carboxylic acid esters, metal salts of carboxylic acid and polyalkylene glycols in addition to polyolefins and furthermore lubricant powders such as molybdenum disulfide, silicon compounds and fluorine compounds. It is preferred to add these lubricants in an amount of 0.1–10% by weight of solid content of coating composition to make a further improvement of workability. An especially preferred lubricant is a polyethylene wax having a molecular weight of 1,000–10,000 and an acid value of 15 KOH mg/g or less. When the addition amount of this wax is less than 0.1% by weight, the frictional resistance on the surface of the coating film is high and dragging of the mold and peeling of the coating film occur during press working. When it is more than 10% by weight, shrinkage unevenness of the lubricants is produced in water cooling zone after baking of the coating film. This often damages the finished appearance of the coat.

If the acid value of the wax exceeds 15 KOH mg/g, the wax dissolves into the coating film and so the lubricating effect of the wax for the coating film decreases. Therefore, the acid value must be 15 KOH mg/g or less and thus a wax layer is formed on the surface of the coating film and exhibits high lubricating effects. This wax layer is mainly formed in the depressed portions and these portions act as current-carrying points to prevent formation of gas pinholes or craters during the cationic electrodeposition coating employed for the coating of automobiles, resulting in stable production of a beautiful electrodeposition appearance.

The amount of said amount lubricant added in the coating composition is preferably 0.3–3% by weight.

In this invention, when the thickness of the coating film of the coating composition is less than 0.3 μm as a solid film, corrosion resistance is not sufficient and when it is more than 5 μm, difficulties occur in spot weldability and appearance of the electrodeposited coating. The practically preferred range of thickness is 0.5–2 μm.

In the organic composite-plated steel sheet of this invention, the coating composition which constitutes the organic solvent type coating film of the uppermost layer may contain the following pigments for further improvement of function of the coating film. That is, rustproofing pigments such as chromate pigments, especially insoluble zinc, lead and barium salts, phosphate pigments and plumbate salt pigments, loading pigments such as carbonate pigments and silicate pigments, coloring pigments such as titanium oxide and carbon, rustproofing agents such as amine compounds, phenolic carboxylic acid and dispersion stabilizers. Considering spot weldability and press workability, the average particle size thereof is adjusted preferably to 10 mμ or less.

The baking conditions for the coating film of the coating composition is not critical, but it is possible to carry out short time baking treatment with retention of good performances at final temperature of the sheet at baking in a wide range of 100°–200° C.

Coating can be performed by any known methods such as roll coating method, curtain flow coating method and the like.

The organic composite-plated steel sheet of this invention has been markedly improved in press workability and spot weldability to remove the problems seen in these properties in the conventional sheets and has been further improved in electrodeposition coatability and corrosion resistance. This organic composite-plated steel sheet meets the requirements in the market.

This invention will be explained by the following examples in more detail.

EXAMPLE

A low-carbon steel sheet of 0.8 mm thick was subjected to the zinc or zinc base composite alloy plating or aluminum plating as shown in Table 1 by known methods and immediately thereafter to the insoluble chromate treatment as shown in Table 1. Subsequently, the coating composition having the specific composition as shown in Table 1 was coated on one side at the given thickness by roll coating and immediately was subjected to baking treatment so that the highest temperature of the sheet reached 150° C. in 20 seconds. Performances of the thus coated steel sheets are shown in Table 1. Blending ratios of the components of the coating compositions are shown by % by weight. Effects of insoluble property and coverage (adhering amount) of the chromate film as an undercoat are shown in Examples 1–12 and Comparative Examples 13–15. It will be clear therefrom that the chromate film provided between the coating film and the under plating layer must be insoluble in water for improvements of various properties such as corrosion resistance. Further, it will be recognized that the range of coverage specified in this invention is preferred from the points of properties and cost.

Effects of the requirements in the coating composition in this invention will be explained.

First, proper molecular weight and blending ratio of the principal resin are shown by Examples 3 and 16-18, Comparative Examples 19-20 and Examples 21-24. From the results, it can be seen that epoxy resins are preferred as the principal resin and too high molecular weight thereof is not so effective for corrosion resistance and press workability and preferred molecular weight is 4,000 or less. Furthermore, the amount of the principal resin is preferably 30-50% by weight.

Next, as shown in Examples 25-27 and 3 and Comparative Examples 28-29, hexamethylene diisocyanate base curing agents are preferred as the curing agent for the resin and those which are blocked at isocyanate group (—NCO) with ethyl acetoacetate or ε-caprolactam are desirable from the points of the pot life of the coating composition and coating operation. Further, it will be seen that the blending ratio of the curing agent is suitably 1-20, preferably 3-10 for 10 of the principal resin in order to obtain sufficient film strength by low temperature baking.

Fumed silica contained in the coating film greatly contributes to obtaining high corrosion resistance of the organic composite-plated steel sheet of this invention and blending ratio and proper particle size are shown by Examples 3 and 30-38 and Comparative Examples 39-41. It can be seen therefrom that fumed silica of fine particles is preferred and water resistance and swelling resistance of the coating film can be improved and high corrosion resistance can be attained by adding such fumed silica in an amount within the range as specified in this invention.

Next, with reference to the lubricant used in the coating film in this invention, examination was made mainly on polyethylene lubricant and the results are shown in Examples 3 and 42-47 and Comparative Examples 48-49. Even when no polyethylene lubrication was contained, there will be no practical problem in press workability (powdering), but in order to further decrease the frictional resistance of the coating film to maintain faultless workability level without the possibility of dragging, it is preferred to add the lubricant in an amount as specified in this invention. Addition of the lubricant in too much amount causes reduction of water swelling resistance of coating film resulting in deterioration or corrosion resistance.

Results of investigation on proper organic solvents in coating film are shown in Examples 3 and 50 and Comparative Examples 51-52.

An organic solvents used in this invention, ketone solvents may be used alone or in admixture. However, water or alcohol solvents which are poor in compatibility with polyisocyanate curing agents and cause difficulties in coating operation and quality should not be used.

The proper thickness of the coating film is investigated in Examples 53-59 and Comparative Examples 60-61. As is clear from the results, the range as specified in this invention is necessary to employ in view of corrosion resistance and spot weldability. Results obtained when the kind of the under plating layer is changed are shown in Examples 62-76, from which it will be recognized that this invention can be applied to various under plating layers deposited on steel sheets.

As explained above, the organic composite-plated steel sheet of this invention which comprises an under plated steel sheet, a first layer of a special insoluble chromate film provided on said under plating layer and a second layer of a specific coating composition having a specific thickness as a solid film provided on said first layer has markedly improved corrosion resistance, press workability, electrodeposition coatability, chromium dissolving-out resistance and spot weldability and this steel sheet sufficiently meets the demands of the users. Furthermore, baking of the coating film at low temperatures also becomes possible and thus the deterioration of material of base can also be overcome. Such are expected results.

Chemicals and methods of evaluation used in the examples and comparative examples given in Table I are as shown in the notes after Table I.

TABLE I

| | | | | | | Organic solvent type coating film | | | | | | | |
|---|---|---|---|---|---|---|---|---|---|---|---|---|---|
| | | Plating *1 | | Chromate *2 | | Main resin *3 | | | Curing agent *4 | | Fumed silica *5 | | Blending *6 |
| | No. | Kind | Amount ($g/m^2$) | Content of water soluble matter (%) | Coverage T · Cr ($mg/m^2$) | Kind | Molecular weight | Blending ratio % | Kind | Blending ratio | Average particle size (mμ) | Blending ratio (%) | ratio of lubricant (%) |
| Example | 1 | Electroplating of Zn—Ni alloy | 20 | 0 | 40 | Epoxy | 2900 | 48.7 | HMDI-AEA | 5/10 | AEROSIL 300 8 | 25 | 2 |
| Example | 2 | " | " | 0.3 | " | " | " | " | " | " | AEROSIL 300 8 | " | " |
| Example | 3 | " | " | 0.5 | " | " | " | " | " | " | AEROSIL 300 8 | " | " |
| Example | 4 | " | " | 1.0 | " | " | " | " | " | " | AEROSIL 300 8 | " | " |
| Example | 5 | " | " | 3.0 | " | " | " | " | " | " | AEROSIL 300 8 | " | " |
| Example | 6 | " | " | 5.0 | " | " | " | " | " | " | AEROSIL 300 8 | " | " |
| Example | 7 | " | " | 0.5 | 10 | " | " | " | " | " | AEROSIL 300 8 | " | " |
| Example | 8 | " | " | " | 20 | " | " | " | " | " | AEROSIL 300 8 | " | " |
| Example | 9 | " | " | " | 60 | " | " | " | " | " | AEROSIL 300 8 | " | " |
| Example | 10 | " | " | " | 100 | " | " | " | " | " | AEROSIL 300 8 | " | " |
| Example | 11 | " | " | " | 120 | " | " | " | " | " | AEROSIL 300 8 | " | " |
| Example | 12 | " | " | " | 150 | " | " | " | " | " | AEROSIL 300 8 | " | " |
| Comparative Example | 13 | " | " | 10.0 | 40 | " | " | " | " | " | AEROSIL 300 8 | " | " |
| Comparative Example | 14 | " | " | 0.5 | 5 | " | " | " | " | " | AEROSIL 300 8 | " | " |
| Comparative Example | 15 | " | " | " | 200 | " | " | " | " | " | AEROSIL 300 8 | " | " |
| Example | 16 | " | " | " | 40 | " | 470 | " | " | " | AEROSIL 300 8 | " | " |
| Example | 17 | " | " | " | " | " | 1000 | " | " | " | AEROSIL 300 8 | " | " |
| Example | 18 | " | | " | " | " | 3750 | " | " | " | AEROSIL 300 8 | " | " |
| Comparative Example | 19 | " | " | " | " | Oil free polyester | 15000 | " | " | " | AEROSIL 300 8 | " | " |
| Comparative Example | 20 | " | " | " | " | Carboxy-lated poly-ethylene | 100000 | 75.0 | — | — | SNOWTEX N 10-20 | " | — |
| Example | 21 | " | " | " | " | Epoxy | 2900 | 66.4 | HMDI-AEA | 1/10 | AEROSIL 300 8 | " | 2 |
| Example | 22 | " | " | " | " | " | " | 56.2 | " | 3/10 | AEROSIL 300 8 | " | " |
| Example | 23 | " | " | " | " | " | " | 39.4 | " | 10/10 | AEROSIL 300 8 | " | " |

TABLE I-continued

| | | | | | | | | | | | | | |
|---|---|---|---|---|---|---|---|---|---|---|---|---|---|
| Example | 24 | " | " | " | " | " | " | 33.2 | " | 12/10 | AEROSIL 300 8 | " | " |
| Example | 25 | " | " | " | " | " | " | 48.7 | HMDI | 5/10 | AEROSIL 300 8 | " | " |
| Example | 26 | " | " | " | " | " | " | " | HMDI-CLN | " | AEROSIL 8 | " | " |
| Example | 27 | " | " | " | " | " | " | " | HMDI-AEA 3 BKS 316 2 | " | AEROSIL 300 8 | " | " |
| Comparative Example | 28 | " | " | " | " | " | " | 60.8 | SUPER-BECKAMINE | 2/10 | AEROSIL 300 8 | " | " |
| Comparative Example | 29 | " | " | " | " | " | " | " | BKS-316 | " | AEROSIL 300 8 | " | " |
| Example | 30 | " | " | " | " | " | " | 62.1 | HMDI-AEA | 5/10 | AEROSIL 300 8 | 5 | " |
| Example | 31 | " | " | " | " | " | " | 58.7 | " | " | AEROSIL 300 8 | 10 | " |
| Example | 32 | " | " | " | " | " | " | 55.3 | " | " | AEROSIL 300 8 | 15 | " |
| Example | 33 | " | " | " | " | " | " | 42.0 | " | " | AEROSIL 300 8 | 35 | " |
| Example | 34 | " | " | " | " | " | " | 35.4 | " | " | AEROSIL 300 8 | 50 | " |
| Example | 35 | " | " | " | " | " | " | 48.7 | " | " | AEROSIL 300 0.1 | 25 | " |
| Example | 36 | " | " | " | " | " | " | " | " | " | AEROSIL 300 1 | " | " |
| Example | 37 | " | " | " | " | " | " | " | " | " | AEROSIL 300 40 | " | " |
| Example | 38 | " | " | " | " | " | " | " | " | " | AEROSIL 300 100 | " | " |
| Comparative Example | 39 | " | " | " | " | " | " | " | " | " | Silica powder 1000 | " | " |
| Comparative Example | 40 | " | " | " | " | " | " | 63.3 | " | " | AEROSIL 300 | 3 | " |
| Comparative Example | 41 | " | " | " | " | " | " | 28.7 | " | " | " | 55 | " |
| Example | 42 | " | " | " | " | " | " | 48.7 | " | " | " | 25 | 0.1 |
| Example | 43 | " | " | " | " | " | " | " | " | " | " | " | 0.5 |
| Example | 44 | " | " | " | " | " | " | " | " | " | " | " | 1 |
| Example | 45 | " | " | " | " | " | " | " | " | " | " | " | 3 |
| Example | 46 | " | " | " | " | " | " | " | " | " | " | " | 5 |
| Example | 47 | " | " | " | " | " | " | " | " | " | " | " | 10 |
| Comparative Example | 48 | " | " | " | " | " | " | " | " | " | " | " | 0 |
| Comparative Example | 49 | " | " | " | " | " | " | " | " | " | AEROSIL 300 8 | 25 | 15 |
| Example | 50 | " | " | " | " | " | " | " | " | " | AEROSIL 300 8 | " | 2 |
| Comparative Example | 51 | " | " | " | " | " | " | " | " | " | AEROSIL 300 8 | " | " |
| Comparative Example | 51 | " | " | " | " | " | " | " | " | " | AEROSIL 300 8 | " | " |
| Comparative | 52 | " | " | " | " | " | " | " | " | " | AEROSIL 300 | " | " |

TABLE I-continued

| | | | | | | | | | | | | | |
|---|---|---|---|---|---|---|---|---|---|---|---|---|---|
| Example | | | | | | | | | | | 8 | | |
| Example | 53 | " | " | " | " | " | " | " | " | " | AEROSIL 300 8 | " | " |
| Example | 54 | " | " | " | " | " | " | " | " | " | AEROSIL 300 8 | " | " |
| Example | 55 | " | " | " | " | " | " | " | " | " | AEROSIL 300 8 | " | " |
| Example | 56 | " | " | " | " | " | " | " | " | " | AEROSIL 300 8 | " | " |
| Example | 57 | " | " | " | " | " | " | " | " | " | AEROSIL 300 8 | " | " |
| Example | 58 | " | " | " | " | " | " | " | " | " | AEROSIL 300 8 | " | " |
| Example | 59 | " | " | " | " | " | " | " | " | " | AEROSIL 300 8 | " | " |
| Comparative Example | 60 | " | " | " | " | " | " | " | " | " | AEROSIL 300 8 | " | " |
| Comparative Example | 61 | " | " | " | " | " | " | " | " | " | AEROSIL 300 8 | " | " |
| Example | 62 | Electroplating of Zn—Fe alloy | 90 | " | " | " | " | " | " | " | AEROSIL 300 8 | " | " |
| Example | 63 | " | 20 | " | " | " | " | " | " | " | AEROSIL 300 8 | " | " |
| Example | 64 | Electroplating of dispersion type alloy Zn—Ni—$SiO_2$ | " | " | " | " | " | " | " | " | AEROSIL 300 8 | " | " |
| Example | 65 | Electroplating of dispersion type alloy Zn—Fe—$SiO_2$ | " | " | " | " | " | " | " | " | AEROSIL 300 8 | " | " |
| Example | 66 | Electroplating of dispersion type alloy Zn—Fe—$TiO_2$ | 30 30 | " | " | " | " | " | " | " | AEROSIL 300 8 | " | " |
| Example | 67 | Electroplating of dispersion type alloy Zn—Fe—$Al_2O_3$ | 20 | " | " | " | " | " | " | " | AEROSIL 300 8 | " | " |
| Example | 68 | Electroplating of dispersion type alloy Zn—Fe—Cr—$ZrO_2$ | " | " | " | " | " | " | " | " | AEROSIL 300 8 | " | " |
| Example | 69 | Electroplating of dispersion type alloy Zn—Fe—Cr—$SiO_2$ | 29 | " | " | " | " | " | " | " | AEROSIL 300 8 | " | " |
| Example | 70 | Hot dip galvanealing of Zn—Fe alloy | 60 | " | " | " | " | " | " | " | AEROSIL 300 8 | " | " |
| Example | 71 | Hot dip plating of Zn—5Al alloy | " | " | " | " | " | " | " | " | AEROSIL 300 8 | " | " |
| Example | 72 | Hot dip plating of Zn—5Al—0.1 Mg alloy | " | " | " | " | " | " | " | " | AEROSIL 300 8 | " | " |
| Example | 73 | Electroplating of Zn—Fe alloy in two layers | 20 | " | " | " | " | " | " | " | AEROSIL 300 8 | " | " |
| Example | 74 | Hot dip plating of Zn—5.5Al—0.1Si | 60 | " | " | " | " | " | " | " | AEROSIL 300 8 | " | " |
| Example | 75 | Hot dip aluminizing | " | " | " | " | " | " | " | " | AEROSIL 300 8 | " | " |
| Example | 76 | Hot dip galvanizing Zn | " | " | " | " | " | " | " | " | AEROSIL 300 8 | " | " |

| | Organic solvent type coating film | | | Performances *8 | | | | |
|---|---|---|---|---|---|---|---|---|
| | Organic solvent | | Thickness *7 | | | Electrodeposition | | |
| | | Blending | of coating | Press | Spot | coatability | Corrosion | Adhesion of | Dissolving-out |

TABLE I-continued

| | No. | Kind | ratio (%) | film (μm) | workability | weldability | Appearance | Adhesion | resistance | coating film | of chromium |
|---|---|---|---|---|---|---|---|---|---|---|---|
| Example | 1 | Cyclohexanone | 55.2 | 1.0 | ◎ | ◎ | ◎ | ◎ | ◎ | ◎ | ◎ |
| Example | 2 | " | " | " | " | " | " | " | " | " | " |
| Example | 3 | " | " | " | " | " | " | " | " | " | " |
| Example | 4 | " | " | " | " | " | " | " | " | " | " |
| Example | 5 | " | " | " | " | " | " | " | " | " | " |
| Example | 6 | " | " | " | " | " | " | " | " | " | " |
| Example | 7 | " | " | " | " | " | " | " | " | " | " |
| Example | 8 | " | " | " | " | " | " | " | " | " | " |
| Example | 9 | " | " | " | " | " | " | " | " | " | " |
| Example | 10 | " | " | " | " | " | " | " | " | " | " |
| Example | 11 | " | " | " | " | " | " | " | " | " | " |
| Example | 12 | " | " | " | " | " | " | " | " | " | " |
| Comparative Example | 13 | " | " | " | " | " | Δ | Δ | ○ | Δ | x |
| Comparative Example | 14 | " | " | " | ○ | " | ◎ | ○ | x-Δ | Δ | ◎ |
| Comparative Example | 15 | " | " | " | Δ-○ | Δ | ○ | Δ-○ | ○-◎ | Δ- | ◎-○ |
| Example | 16 | " | " | " | ◎ | ◎ | ◎ | ◎ | ◎ | ◎ | ◎ |
| Example | 17 | " | " | " | " | " | " | " | " | " | " |
| Example | 18 | " | " | " | " | " | " | " | " | " | " |
| Comparative Example | 19 | " | " | " | " | " | " | ○ | x | " | " |
| Comparative Example | 20 | Water | 80 | " | x | " | " | x | " | " | " |
| Example | 21 | Cyclohexanone | 49.7 | " | ◎ | " | " | ◎ | ◎ | " | " |
| Example | 22 | " | 52.9 | " | " | " | " | " | " | " | " |
| Example | 23 | " | 59.1 | " | " | " | " | " | " | " | " |
| Example | 24 | " | 60.1 | " | " | " | " | " | " | " | " |
| Example | 25 | " | 56.7 | " | " | " | " | " | " | " | " |
| Example | 26 | " | " | " | " | " | " | " | " | " | " |
| Example | 27 | " | 54.2 | " | " | " | " | " | " | " | " |
| Comparative Example | 28 | " | 47.7 | " | ○ | " | " | ◎-○ | ○ | ○ | " |
| Comparative Example | 29 | " | 50.2 | " | " | " | " | ○ | " | " | " |
| Example | 30 | " | 50.5 | " | ◎ | " | " | ◎ | ◎ | ◎ | " |
| Example | 31 | " | 53.0 | " | " | " | " | " | " | " | " |
| Example | 32 | " | 52.5 | " | " | " | " | " | " | " | " |
| Example | 33 | " | 57.5 | " | " | " | " | " | " | " | " |
| Example | 34 | " | 59.8 | " | " | " | " | " | " | " | " |
| Example | 35 | " | 55.2 | " | " | " | " | " | " | " | " |
| Example | 36 | " | " | " | " | " | " | " | " | " | " |
| Example | 37 | " | " | " | " | " | " | " | " | " | " |
| Example | 38 | " | " | " | " | " | " | " | " | " | " |
| Comparative Example | 39 | " | " | " | x | Δ-○ | ○ | ○ | x | Δ-○ | " |
| Comparative Example | 40 | " | 49.3 | " | ◎ | ○ | ○ | ◎ | x | ◎ | " |
| Comparative Example | 41 | " | 63.3 | " | x | x-Δ | ○ | Δ | ○ | x | " |
| Example | 42 | " | 55.2 | " | ◎ | ◎ | ◎ | ◎ | ◎ | ◎ | " |

TABLE I-continued

| | | | | | | | | | | | |
|---|---|---|---|---|---|---|---|---|---|---|---|
| Example | 43 | " | " | " | " | " | " | " | " | " | " |
| Example | 44 | " | " | " | " | " | " | " | " | " | " |
| Example | 45 | " | " | " | " | " | " | " | " | " | " |
| Example | 46 | " | " | " | " | " | " | " | " | " | " |
| Example | 47 | " | " | " | " | " | " | " | " | " | " |
| Comparative Example | 48 | " | " | " | ○ | " | ○-Δ | " | ○-Δ | " | " |
| Comparative Example | 49 | " | " | " | ◎ | " | ◎ | " | Δ | " | " |
| Example | 50 | $\frac{\text{Acetone}}{\text{Isophorone}} = \frac{1}{1}$ | " | " | " | " | " | " | ◎ | " | " |
| Comparative Example | 51 | Ethylene glycol monoethyl ether acetate | " | " | (Coating was impossible due to high viscosity) | | | | | | |
| Comparative Example | 52 | Benzyl alcohol | " | " | x | ○ | x | x | Δ | x | ◎ |
| Example | 53 | Cyclohexanone | " | 0.3 | ○ | ◎ | ◎ | ◎ | ◎ | ◎ | " |
| Example | 54 | " | " | 0.7 | " | " | " | " | " | " | " |
| Example | 55 | " | " | 1.4 | " | " | " | " | " | " | " |
| Example | 56 | " | " | 1.8 | " | " | " | " | " | " | " |
| Example | 57 | " | " | 2.5 | " | " | " | " | " | " | " |
| Example | 58 | " | " | 3.5 | " | " | " | " | " | " | " |
| Example | 59 | " | " | 5.0 | " | " | " | " | " | " | " |
| Comparative Example | 60 | " | " | 0.1 | ◎-○ | " | " | " | Δ | " | " |
| Comparative Example | 61 | " | " | 10.0 | ◎ | x | x-○ | " | ◎ | " | " |
| Example | 62 | " | | 1.0 | " | ◎ | ◎ | " | " | " | " |
| Example | 63 | " | " | " | " | " | " | " | " | " | " |
| Example | 64 | " | " | " | " | " | " | " | " | " | " |
| Example | 65 | " | " | " | " | " | " | " | " | " | " |
| Example | 66 | " | " | " | " | " | " | " | " | " | " |
| Example | 67 | " | " | " | " | " | " | " | " | " | " |
| Example | 68 | " | " | " | " | " | " | " | " | " | " |
| Example | 69 | " | " | " | " | " | " | " | " | " | " |
| Example | 70 | " | " | " | " | " | " | " | " | " | " |
| Example | 71 | " | " | " | " | " | " | " | " | " | " |
| Example | 72 | " | " | " | " | " | " | " | " | " | " |
| Example | 73 | " | " | " | " | " | " | " | " | " | " |
| Example | 74 | " | " | " | " | " | " | " | " | " | " |
| Example | 75 | " | " | " | " | " | " | " | " | " | " |
| Example | 76 | " | " | " | " | " | " | " | " | " | " |

Notes:

*1: Measurement of amount deposited is in accordance with JIS H-0401.

*2: Content of water soluble matter is shown by the ratio of difference in chromium deposition amount before and after dipping in boiling distilled water for 30 minutes and initial deposited amount. Fluorescent X-ray analysis is used.

*3: Type and molecular weight of main resins. (Blending ratio is shown by % by weight for solid content of coating composition.)

EPIKOAT 1001 (Bisphenol type epoxy resin supplied by Shell Chemical Co.) - Molecular weight 900.

EPIKOAT 1007 (Bisphenol type epoxy resin supplied by Shell Chemical Co.) - Molecular weight 2900.

EPIKOAT 1009 (Bisphenol type epoxy resin supplied by Shell Chemical Co.) - Molecular weight 3750.

BYRON 200 (Oil free polyester resin supplied by Toyobo Co. Ltd.) - Molecular weight 15000

TABLE 1-continued

Carboxylated polyethylene resin (carboxyl group 12 mol %, in the form of 20% aqueous solution)
*4: Curing agent (Blending ratio is shown by % by weight for solid content of the coating composition.) (Trimmer type)
HMDI: Hexamethylene diisocyanate
HMDI-AEA: Blocked ethyl acetoacetate.
HMDI-CLN: Blocked ε-caprolactam.
SUPERBECKAMINE J-820-60 (melamine resin 60% supplied by Dainippon Ink & Chemicals Inc.) (for comparative examples). Phenolic resin BKS-316 (Resol type phenolic resin supplied by Showa Kobunshi Co.)
*5: Fumed silica (Blending ratio is shown by % by weight for solid content of the coating composition.).
AEROSIL 300 (Japan Aerosil Co.) - average particle size 8 mμ
AEROSIL OX50 (Japan Aerosil Co.) - average particle size 40 mμ
SNOWTEX N (Nissan Chemical Industries, Ltd.) in the form of 20% aqueous colloidal silica solution.
*6: Polyethylene was (Blending ratio is shown by % by weight for solid content of the coating composition.)
SERIDUST 3620 (Hoecht Co.) - Density: 0.95–0.97, Molecular weight: 2000 and Acid value: 0.
*7: Weight method: This is calculated from the difference between the initial weight of the uncoated steel sheet and weight of the same steel sheet of which the coating composition is coated and dried.
*8: Performance test methods
(1) Press workability: The Sheet is subjected to cylindrical drawing (without coating oil) and thereafter, the surface of the worked portion on the die side is subjected to a peeling test by adhesive cellophane tape and the workability is evaluated by the following four gradings.
◎: No peeling occurred.
○: A few dragging occurred with no peeling.
Δ: A slight powdering occurred.
x: Considerable powdering and peeling occurred.
(2) Spot weldability (continuous spotting): This is measured using a copper electrode having a tip diameter of 6 mm with a pressing force of 200 kg · f and a current of 8–9 KA at 10 cycles and evaluated by the following four gradings.
◎: Continuously 5000 or more spottings.
○: Continuously 4000 or more spottings.
Δ: Continuously 2000 or more spottings.
x: Continuously less than 2000 spottings.
(3) Electrodeposition coatability: After phosphoric acid treatment (PB3020 supplied by Japan Parkerizing Co.), cation electro-deposition was conducted with POWERTOP U-100 (supplied by Nippon Paint Co., Ltd.) at 20 μm.
(i) Appearance: Presence of gas pinholes and craters is examined and evaluated by the following gradings.
◎: No defects occurred.
○: A few gas pinholes occurred.
Δ: Gas pinholes occurred partially.
x: Gas pinholes occurred on the whole surface.
(ii) Adhesion: The sheet is dipped in a warm water of 40° C. for 10 days and then 100 squares of 1 mm × 1 mm are cut on the surface. This surface is subjected to a peeling test by adhesive tape. The adhesion is evaluated by the following gradings.
◎: No peeling occurred.
○: Slight peeling occurred.
Δ: Partial peeling occurred.
x: Considerable peeling occurred.

TABLE I-continued (4) Corrosion resistance: This is evaluated by salt spray test (JIS Z-2371) of 2000 hours with a sheet having ½ crosscut.
⊙: White rust of less than 10%
○: White rust of less than 30%
Δ: Red rust of less than 5%
x: Red rust of more than 5%
(5) Adhesion of coating film: Secondary adhesion is evaluated by dipping the sheet with a coating film in boiling water for 4 hours, cutting 100 squares of 1 mm × 1 mm on the surface and subjecting the surface to a peeling test by adhesive tape.
⊙: No peeling occurred.
○: Slight peeling occurred.
Δ: Partial peeling occurred.
x: Peeling occurred on the whole surface.
(6) Dissolving-out of chromium: The sheet is degreased with alkali (spray treatment with degreasing solution containing 20 g/l of L-4410 supplied by Japan Parkerizing Co. at 60° C. for 5 minutes) and then the total amount of chromium dissolving out into the degreasing solution is measured.
⊙: Up to 5 $mg/m^2$.
○: Up to 10 $mg/m^2$.
Δ: Up to 30 $mg/m^2$.
x: More than 30 $mg/m^2$.

What is claimed is:

1. A steel sheet having an organic composite plating layer which comprises a steel sheet plated with zinc, aluminum or zinc base composite alloy as a substrate, a first layer of insoluble chromate film of 5% or less in content of water-soluble matter formed on the surface of said substrate at a coverage of 10–150 mg/m$^2$ in terms of total chromium content and a second layer from a coating composition having the following composition coated at a thickness of 0.3–5 μm as a solid content film on said first layer:

(A) a bisphenol type epoxy resin having terminal epoxy groups and having a number-average molecular weight of 300–100,000 in an amount of 30% by weight or more based on solid content in the coating composition, (B) at least one curing agent selected from the group consisting of a polyisocyanate compound and a block polyisocyanate compound at a weight ratio to solid content in the epxoxy resin of 1/10–20/10, (C) fumed silica having an average particle size of 0.1–100 mμ in an amount of 5–50% by weight based on solid content in the coating composition, and (D) a ketone organic solvent in an amount of 40% by weight or more of the coating composition, and the solid content in the coating composition being 10–50% by weight.

2. A steel sheet according to claim 1 wherein the ketone organic solvent (D) is at least one compound selected from the group consisting of methyl isobutyl ketone, acetone, cyclohexanone and isophorone.

3. A steel sheet according to claim 1 wherein the coating composition additionally contains a resol type phenolic resin at a weight ratio to solid content in the curing agent (B) of 10/1–1/10.

4. A steel sheet according to claim 3 wherein the resol type phenolic resin is represented by the following formula:

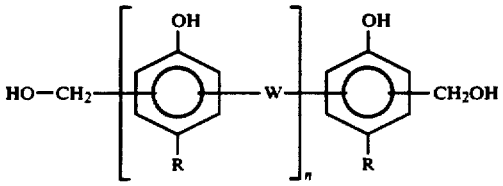

wherein n represents 0–4, W represents —$CH_2$— or —$CH_2$—O—$CH_2$— and R represents $CH_3$, H or

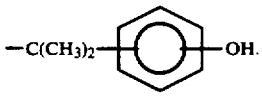

5. A steel sheet according to claim 1 wherein the coating composition additionally contains a polyethylene wax in an amount of 0.1–10% by weight based on solid content of the coating composition.

6. A steel sheet according to claim 5 wherein the polyethylene wax has an acid value of 15 KOH mg/g or less.

7. A steel sheet according to claim 1 wherein the bisphenol type epoxy resin (A) is represented by the following formula:

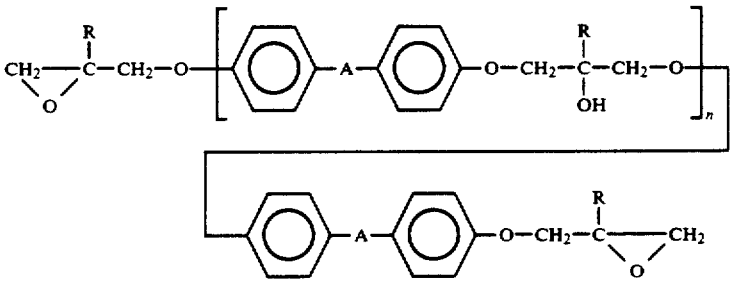

wherein R represents H or $CH_3$ and —A— represents $>C(CH_3)_2$, —$CH_2$—, —O—,

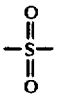

or —S—.

8. A steel sheet according to claim 7 wherein the coating composition additionally contains a resol type phenolic resin at a weight ratio to solid content in the curing agent (B) of 10/1–1/10.

9. A steel sheet according to claim 7 wherein the coating composition additionally contains a polyethylene wax in an amount of 0.1–10% by weight based on solid content of the coating composition.

10. A steel sheet according to claim 9 wherein the coating composition additionally contains a resol type phenolic resin at a weight ratio to solid content in the curing agent (B) of 10/1–1/10 and wherein the resol type phenolic resin is represented by the following formula:

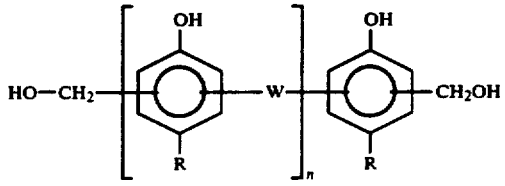

wherein n represent 0–4, W represents —$CH_2$— or —$CH_2$—O—$CH_2$— and R represents $CH_3$, H or

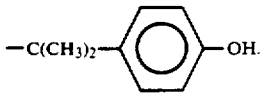

11. A steel sheet according to claim 10 wherein the polyethylene wax has an acid value of 15 KOH mg/g or less and wherein the ketone organic solvent (D) is at least one compound selected from the group consisting of methyl isobutyl ketone, acetone, cyclohexanone and isophorone.

12. A method for making a steel sheet having organic composite plating layer which comprises plating a steel sheet with zinc, aluminum or zinc base composite alloy, forming thereon an insoluble chromate film of 5% or less in content of water-soluble matter at a coverage of 10–150 mg/m$^2$ in terms of total chromium content, coating thereon in the form of a thin film a coating composition having the following composition at a thickness of 0.3–5 μm as a solid film and then baking the coating film:

(A) a bisphenol type epoxy resin having terminal epoxy groups and having a number-average molecular weight of 300–100,000 in an amount of 30% by weight or more based on solid content in the coating composition, (B) at least one curing agent selected from the group consisting of a polyisocyanate compound and a block polyisocyanate compound at a weight ratio to solid content in the epoxy resin of 1/10–20/10, (C) fumed silica having an average particle size of 0.1–100 mμ in an amount of 5–50% by weight based on solid content in the coating composition, and (D) a ketone organic solvent in an amount of 40% by weight or more of the coating composition, and the solid content of the coating composition being 10–50% by weight.

* * * * *